F. L. NICHOLS.
APPARATUS FOR DEHYDRATING FOOD PRODUCTS.
APPLICATION FILED FEB. 4, 1919.
1,351,118.
Patented Aug. 31, 1920.
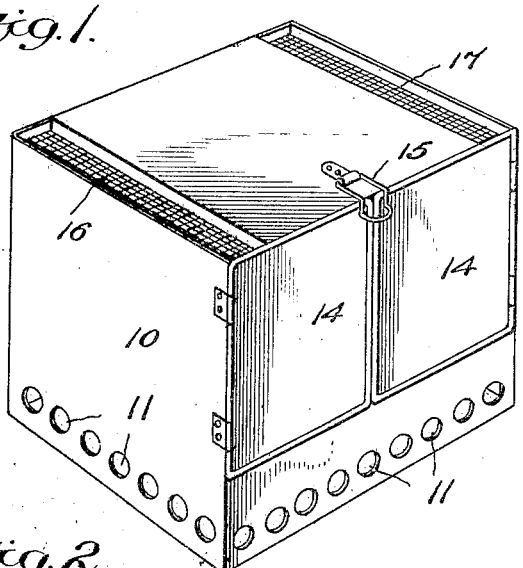
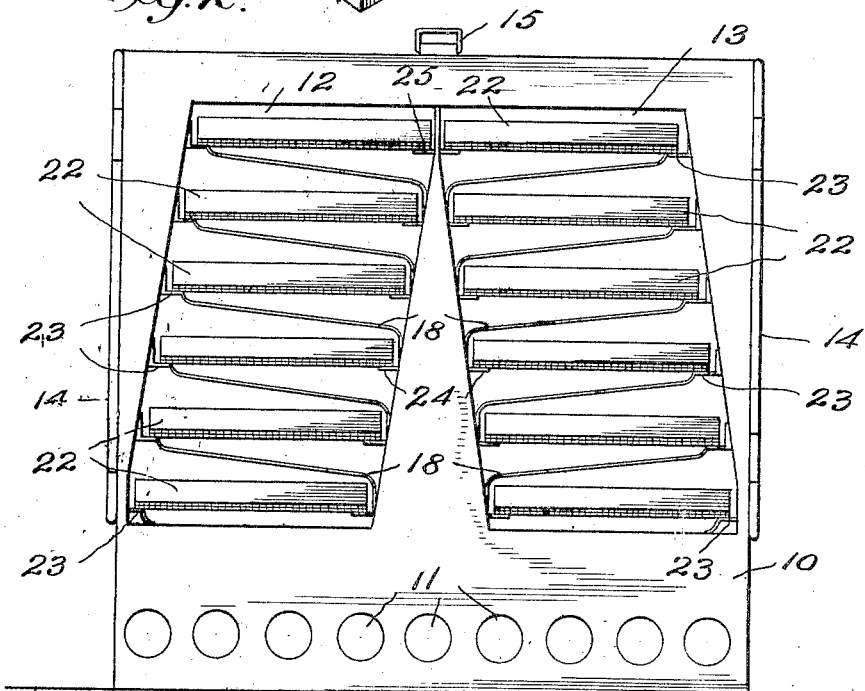
Frank L. Nichols INVENTOR
BY
ATTORNEY F. L. NICHOLS.
APPARATUS FOR DEHYDRATING FOOD PRODUCTS.
APPLICATION FILED FEB. 4, 1919.
1,351,118.
Patented Aug. 31, 1920.
2 SHEETS—SHEET 2.
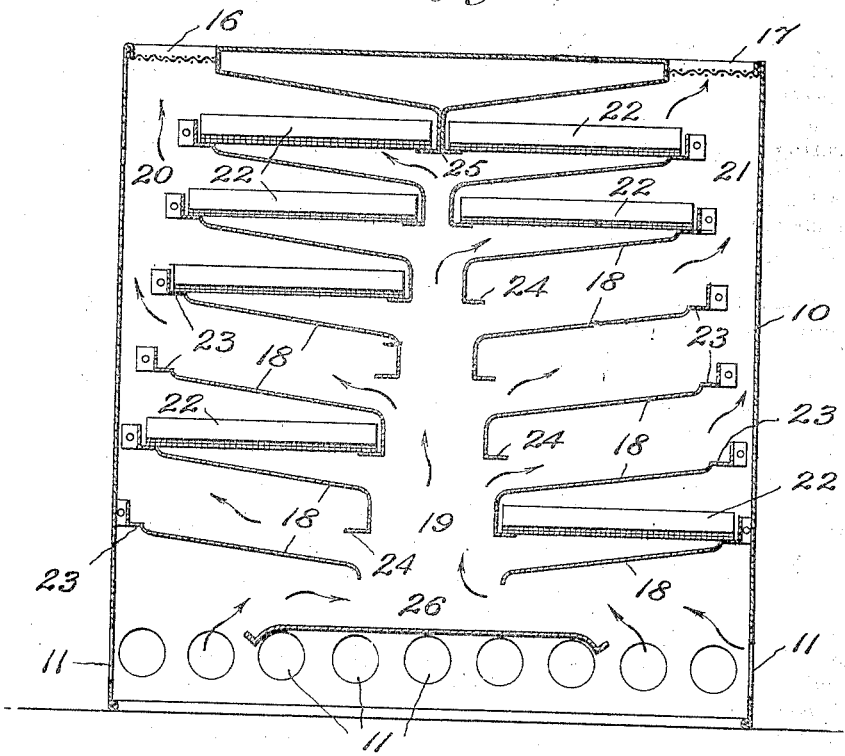
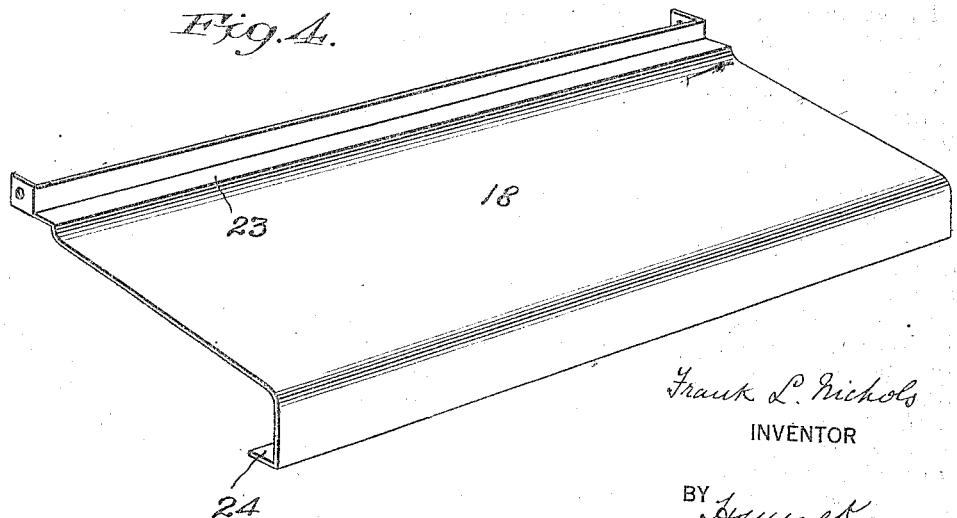
Frank L. Nichols
INVENTOR
BY
ATTORNEY

UNITED STATES PATENT OFFICE.

FRANK L. NICHOLS, OF STAMFORD, CONNECTICUT.

APPARATUS FOR DEHYDRATING FOOD PRODUCTS.

1,351,118.  Specification of Letters Patent.  Patented Aug. 31, 1920.

Application filed February 4, 1919. Serial No. 274,866.

*To all whom it may concern:*

Be it known that I, FRANK L. NICHOLS, a citizen of the United States, residing at Stamford, in the county of Fairfield, State of Connecticut, have invented certain new and useful Improvements in Apparatus for Dehydrating Food Products; and I do hereby declare the following to be a full, clear, and exact description of the invention, such as will enable others skilled in the art to which it appertains to make and use the same.

My present invention relates to a novel and improved apparatus for preserving vegetables, fruits, meats, herbs, etc., by rapid dehydration.

The principal objects of the invention are—First, to secure a more uniform and rapid evaporation of the moisture contained in the material to be dried; second, to insure a uniform distribution of the heat applied, preventing local concentration of heat whereby the recuperative qualities of the product are impaired; third, so to apply the heating medium that the various portions of a given charge are subjected simultaneously to substantially identical heating conditions; and lastly, to attain these ends by convenient, compact and relatively inexpensive means capable of adaptation to use in connection with the various forms of heaters familiar in domestic economy.

I have illustrated my invention in a preferred form, especially adapted to domestic use, in the accompanying drawings wherein Figure 1 is a perspective view of my dehydrator shown closed, Fig. 2 is a front elevation of the same with the doors removed, Fig. 3 is a vertical transverse section of the same, some of the trays being omitted, and Fig. 4 is a perspective view of one of the deflecting plates which separate the independent passages connecting the main flues.

In the specific form shown, which is designed to be set upon a stove, or other heated base, the containing casing 10 (preferably constructed of sheet metal) is entirely closed at the back and two sides, save for the perforations 11 placed near the bottom and intended to admit the air which is heated by radiation or convection from below. The bottom of the casing is preferably left open.

The front wall of the casing is provided with two openings 12 and 13 to permit convenient insertion of the sliding trays upon which the material to be dried is supported, and a door or doors 14, preferably hinged at the side edges serve to close the container during use. These doors are fastened by the swinging catch 15 or other suitable means. The top of the container is closed save at the two sides where the openings 16 and 17 permit the escape of the moisture laden air from the outlet flues.

Extending from the back wall of the container to the front and symmetrically placed on each side are two series of superposed deflecting plates 18, so placed as to form inclined passages between the central space or main inlet flue 19 and the two side outlet flues 20, 21. These plates are preferably arranged to serve the double purpose of partitions between successive hot air passages and supports for the trays 22, upon which the material to be dried is supported. With this latter end in view, the outer and higher edge of each plate 18 is provided with a flat horizontal supporting ledge 23, while the inner edge is downwardly curved and is turned under to form a second supporting ledge 24 (see Fig. 4). The outer ledge of each plate 18 is placed upon the same level as the inner ledge of the plate above it, and the plates 18 are so placed with relation to the openings 12 and 13 in the front of the casing, that the trays 22 can be slid into place upon these supporting ledges through said openings, as shown in Fig. 2. The inner edges of the topmost trays are supported by a plate 25, supported from the top of the casing, as shown in Fig. 3.

It will be seen that the construction described affords a central inlet flue 19 and two outlet flues 20 and 21 at the sides, and that, between the plates 18 independent branch passages afford communication between the inlet and outlet flues. The top of the inlet flue is closed by the plate 25 and by the topmost trays 22, while the side flues are closed at the bottom by the lowermost plates 18, but find their outlet at the openings 16 and 17 in the top of the casing. A baffle plate 26 may be placed in the lower part of the casing, extending from front to back, to insure a more uniform temperature in the central flue, by preventing the heated air from rising too rapidly and directly therein. This baffle plate will be found particularly useful when the drier is used in connection with an oil or gas stove, wherein the heat is provided by a column of heated gases rising directly from a flame. In such cases this plate serves to intercept the too intensely heated gases and causes them to be mixed with cooler air entering through the openings 11 and around the outer parts of the open bottom of the casing.

As shown in the drawings, I prefer to place the deflecting plates 18 so that each plate is set somewhat nearer the center than the one above it. This equalizes the distribution of hot air through the successive passages by causing the inlet flue to become narrower toward the top, while each outlet flue expands upward.

The trays 22 are formed with perforated bottoms (preferably by forming the bottoms of wire mesh and the hot air is thus permitted to pass through each tray placed in its appropriate branch passage, and acts to carry off the moisture contained in the material carried upon it.

It will be seen that, when my drier is placed upon a stove, or hot air is otherwise supplied to it, the original main column of dry heated air will be subdivided into separate streams, flowing independently through the branch passages, and will unite in a main column of cooler air carrying off the moisture from the material treated. In consequence, none of the moisture from one part of the charge will be carried to any other portion, and all parts will be simultaneously dried under substantially identical conditions. The process of drying a given charge will take less time and there will be no danger of overheating one portion in order to complete the economical dehydration of other parts.

It is to be understood that, although I have shown herein a preferred form of apparatus especially adapted to dehydration on a small scale, as is suitable to domestic use, my invention may also be embodied in apparatus intended for dehydration on a large scale, as in factories.

Various changes may be made in my apparatus without departing from the scope of my invention and I do not limit myself to the details herein shown and described.

What I claim is—

1. In apparatus for dehydrating food products, a casing provided with an inlet and an outlet flue, deflecting plates forming separate branch passages between said flues, said deflecting plates being provided at their inner and outer edges with tray supporting ledges and perforated trays supported in a substantially horizontal position upon said ledges.

2. A dehydrating apparatus comprising a containing casing having a tapering inlet flue in the center and two oppositely tapering outlet flues at its sides and having an opening for admitting trays and closing means therefor in front; in combination with superposed inclined deflecting plates opposite said front opening forming separate inclined passages adapted to receive trays through said opening and arranged to communicate on one side with said inlet flue and on the other side with said two outlet flues.

3. A dehydrating apparatus comprising a casing open at the bottom and having air inlet openings around the lower part of the sides thereof, deflecting plates arranged in two superposed series, one on each side of a tapering central flue and having oppositely tapering flues on the outer side of each series, trays adapted to slide into place between said deflecting plates, and doors in the front of said casing adapted to admit said trays and permit their withdrawal at will.

In testimony whereof I affix my signature.

FRANK L. NICHOLS.